(12) United States Patent
Benner (10) Patent No.: US 9,676,469 B2
(45) Date of Patent: Jun. 13, 2017

(54) SYSTEM AND METHOD FOR FASTENING STRUCTURES

(71) Applicant: Kent W. Benner, Fort Worth, TX (US)

(72) Inventor: Kent W. Benner, Fort Worth, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 505 days.

(21) Appl. No.: 14/249,486

(22) Filed: Apr. 10, 2014

(65) Prior Publication Data
US 2015/0291271 A1 Oct. 15, 2015

(51) Int. Cl.
| | |
|---|---|
| *B64C 1/06* | (2006.01) |
| *F16B 5/02* | (2006.01) |
| *B64C 1/12* | (2006.01) |
| *F42B 15/36* | (2006.01) |
| *F02K 1/04* | (2006.01) |
| *F02C 7/00* | (2006.01) |
| *F16B 5/00* | (2006.01) |

(52) U.S. Cl.
CPC ............... *B64C 1/069* (2013.01); *B64C 1/12* (2013.01); *F02C 7/00* (2013.01); *F02K 1/04* (2013.01); *F16B 5/02* (2013.01); *F42B 15/36* (2013.01); *F05D 2260/30* (2013.01); *F05D 2300/224* (2013.01); *F05D 2300/6033* (2013.01); *F16B 5/0012* (2013.01); *Y02T 50/672* (2013.01)

(58) Field of Classification Search
CPC ... B64C 1/069; B64C 1/12; F02C 7/00; F02K 1/04; F05D 2260/30; F16B 5/0012; F16B 5/02; F42B 15/36; Y02T 50/672

USPC ........... 244/131, 119, 121, 132, 120, 117 R; 403/408.1, DIG. 15
See application file for complete search history.

(56) References Cited

U.S. PATENT DOCUMENTS

| | | | | |
|---|---|---|---|---|
| 2,363,358 | A | * | 11/1944 | Punte ................ B21D 51/2676 220/62 |
| 2,405,643 | A | * | 8/1946 | Crot ..................... F16B 5/0004 244/119 |
| 2,466,602 | A | * | 4/1949 | Lombard ................. F02K 1/80 285/261 |
| 2,716,563 | A | * | 8/1955 | Seneschall .............. F01D 15/06 285/231 |

(Continued)

OTHER PUBLICATIONS

EPO Germany Communication regarding extended European search report; Appl. No. 15162305.5-1760; Ref. EP98917GM900ams; Aug. 15, 2015 (Aug. 15, 2015).

*Primary Examiner* — James Ference
(74) *Attorney, Agent, or Firm* — Baker Botts L.L.P.

(57) ABSTRACT

A system includes an outer band, inner band, and a fastener. The outer band covers at least a portion of a first structure and has a first edge opposite a second edge. The second edge forms a first load redistribution ramp corresponding to a bend in the first structure. The inner band is positioned beneath a second structure and has a first surface opposite a second surface. The second surface forms a second load redistribution ramp corresponding to the bend in the first structure. A portion of the inner band adjacent to the second surface forms a curve around an edge of the second structure such that the second load redistribution ramp forms a wedge between the first structure and the second structure. The fastener couples the outer band, first structure, second structure, and inner band.

20 Claims, 5 Drawing Sheets

(56) References Cited

U.S. PATENT DOCUMENTS

| | | | | |
|---|---|---|---|---|
| 2,809,057 | A * | 10/1957 | McEachern | F02K 1/80 285/187 |
| 3,879,916 | A * | 4/1975 | Bigham | F16B 5/0072 403/385 |
| 4,507,011 | A * | 3/1985 | Brown | B29C 65/562 156/304.3 |
| 4,520,364 | A * | 5/1985 | Perry | H01Q 1/28 343/872 |
| 4,702,439 | A * | 10/1987 | Kelley | B64G 1/58 244/131 |
| 4,888,451 | A * | 12/1989 | Toni | H01R 4/64 174/2 |
| 4,921,401 | A * | 5/1990 | Hall | F01D 9/04 403/28 |
| 4,951,973 | A * | 8/1990 | Corsmeier | F01D 25/243 285/24 |
| 5,014,934 | A * | 5/1991 | McClaflin | B64C 1/12 244/129.4 |
| 5,314,144 | A * | 5/1994 | Porter, Jr. | F16B 5/0208 244/119 |
| 5,820,077 | A * | 10/1998 | Sutliff | B64C 1/36 244/119 |
| 5,884,864 | A * | 3/1999 | Sunne | H01Q 1/28 244/121 |
| 5,941,479 | A * | 8/1999 | Sunne | H01Q 1/28 244/121 |
| 6,349,538 | B1 * | 2/2002 | Hunter, Jr. | F02K 7/06 60/204 |
| 7,210,275 | B2 * | 5/2007 | Guinchard | B21D 11/18 52/846 |
| 7,681,834 | B2 * | 3/2010 | Facciano | F42B 10/46 244/119 |
| 7,909,290 | B2 | 3/2011 | Cooper | |
| 8,130,167 | B2 * | 3/2012 | Glabe | H01Q 1/42 343/705 |
| 8,282,042 | B2 * | 10/2012 | Parikh | B64C 1/12 244/130 |
| 8,398,027 | B2 | 3/2013 | Wood | |
| 8,490,920 | B2 * | 7/2013 | Karem | B64C 1/10 244/119 |
| 8,500,068 | B2 * | 8/2013 | Villares | F16B 5/04 244/131 |
| 2006/0248854 | A1 * | 11/2006 | Bartley-Cho | B32B 3/12 52/782.1 |
| 2006/0251496 | A1 * | 11/2006 | Wood | F16B 5/02 411/507 |
| 2008/0164376 | A1 * | 7/2008 | Kato | B64C 3/28 244/132 |
| 2008/0258008 | A1 * | 10/2008 | Cooper | B64C 1/12 244/131 |
| 2009/0020646 | A1 * | 1/2009 | Normand | B64C 1/069 244/120 |
| 2009/0294589 | A1 * | 12/2009 | Berry | B64C 1/12 244/123.1 |
| 2010/0006702 | A1 * | 1/2010 | Fogarty | B29C 65/505 244/131 |
| 2010/0038489 | A1 * | 2/2010 | Bense | B64C 1/12 244/131 |
| 2010/0044514 | A1 * | 2/2010 | Tacke | B64C 1/069 244/131 |
| 2010/0065688 | A1 * | 3/2010 | Wood | B29C 65/562 244/131 |
| 2010/0077690 | A1 * | 4/2010 | Durand | B64C 1/12 52/578 |
| 2010/0308170 | A1 * | 12/2010 | Hadley | B64C 1/12 244/131 |
| 2011/0141645 | A1 * | 6/2011 | Le Louarn | B64D 45/02 361/117 |
| 2011/0271509 | A1 * | 11/2011 | Willdig | B64C 3/26 29/428 |
| 2014/0356057 | A1 * | 12/2014 | Griess | F16B 5/00 403/291 |

* cited by examiner

SYSTEM AND METHOD FOR FASTENING STRUCTURES

TECHNICAL FIELD

This disclosure generally relates to fasteners, and more particularly to a system and method for fastening structures.

BACKGROUND

During construction, it may be necessary to couple structures together. In certain circumstances, it may be desirable for structures to be removably coupled. Such an arrangement may make repairing or replacing the structures simpler. Furthermore, it may allow for easy access to internal components.

SUMMARY OF EXAMPLE EMBODIMENTS

According to embodiments of the present disclosure, disadvantages and problems associated with previous techniques for removably coupling structures may be reduced or eliminated.

In certain embodiments, a system for fastening structures is disclosed. A system includes an outer band, inner band, and a fastener. The outer band covers at least a portion of a first structure. The outer band has a first edge opposite a second edge, the second edge forming a first load redistribution ramp corresponding to a bend in the first structure. The inner band is positioned beneath a second structure. The inner band has a first surface opposite a second surface, the second surface forming a second load redistribution ramp corresponding to the bend in the first structure. A portion of the inner band adjacent to the second surface forms a curve around an edge of the second structure such that the second load redistribution ramp forms a wedge between the first structure and the second structure. The fastener couples together the outer band, first structure, second structure, and inner band. A portion of the fastener extends through apertures in the outer band, first structure, second structure, and inner band.

Certain embodiments of the disclosure may provide one or more technical advantages. For example, an advantage of some embodiments may be that the fastening system allows removable coupling of structures, some of which may be formed from high-temperature composite materials. The low bearing strength of high-temperature composite materials has made them poorly suited for traditional fastening approaches. As another advantage, in certain embodiments the concentrated fastener load is redistributed across larger areas of the high-temperature composite material, making it possible to removably couple a structure formed from high-temperature composite material to another structure. Additionally, an advantage of some embodiments may be that the coupled structures are secured even as they are exposed to high temperatures and may experience thermal expansion. Components of the disclosed fastening system, such as the outer and inner band, may be adapted to thermally expand in a manner that further secures the coupled structures. Furthermore, in certain embodiments the outer band and inner bands may advantageously sandwich the coupled components, further preventing movement in various directions.

Certain embodiments of the present disclosure may include some, all, or none of the above advantages. One or more other technical advantages may be readily apparent to those skilled in the art from the figures, descriptions, and claims included herein.

BRIEF DESCRIPTION OF THE DRAWINGS

For a more complete understanding of the present invention and for further features and advantages thereof, reference is now made to the following description taken in conjunction with the accompanying drawings, in which.

DETAILED DESCRIPTION

Embodiments of the present invention and its advantages are best understood by referring to FIGS. 1-4, like numerals being used for like and corresponding parts of the various drawings.

High-temperature composite parts are desirable for their light weight and ability to withstand high temperatures. Traditionally, the utility of high-temperature composite parts in certain contexts has been limited due to their low bearing strength, preventing the use of traditional fastening methods for many structural applications. Although bonding can be used, it may be desirable to have a high-temperature composite part that is removable. Existing solutions, such as using a scarf joint to bis-maleimids (BMI), allow for removability but require the fastened area to be at a much lower temperature required by the BMI; this prevents its use on areas of aircraft, rockets, and missiles that remain hot, such as nozzle edges, engine parts, or leading and trailing edges. The following addresses these and potentially other deficiencies of existing solutions by providing a system and method for removably fastening structures (e.g., high-temperature composite parts) for a variety of applications.

In general, the disclosed embodiments illustrate a system and method for removably fastening structures. In certain embodiments, one or both of the structures may be a high-temperature composite part. As an example, and not by way of limitation, the high-temperature composite part structures may be formed of ceramic matrix composite (CMC) or carbon/carbon (C/C), or any other suitable material. In certain embodiments, the structures may be components of a variety of systems. For example, the structures may be a radome, nose cone, control surface, access panel, or an exhaust nozzle of an aircraft, rocket, missile, or other high performance structure. The present disclosure contemplates use of a fastening system according to the disclosed embodiments in any suitable application, such as circumstances in which it is desirable to removably couple a high-temperature composite structure to another structure.

As an example, and not by way of limitation, one of the structures to be coupled may be a missile radome formed of high-temperature composite material. The radome may be coupled to another component of the missile, which may, in certain embodiments, not be formed from composite material. To accommodate the properties of the high-temperature composite material, a fastening system according to the disclosed embodiments may effectively sandwich a portion of the high-temperature composite structure and a portion of the structure to which it is being coupled between an inner band and an outer band using a fastener. In certain embodiments of the fastening system, a concentrated fastener bearing load is redistributed into larger areas of the structures. In certain embodiments, the fastening system may prevent direct contact between the fastener and the delicate high-temperature composite structure. In certain embodiments, using the disclosed fastening system to removably couple a high-temperature composite radome to another structure may effectively protect sensors or other components that may be located behind it, while still allowing ready access to the sensors or other components through removable coupling of the structures.

FIGS. 1A through 1D illustrate various views of a system utilizing a fastening system, in accordance with certain embodiments. Fastening system 100 may be used to fasten a first structure 110 to a second structure 120. In certain embodiments, and as illustrated in FIGS. 1A through 1D, fastening system 100 may include an outer band 130, an inner band 140, and a plurality of fasteners 160. In certain embodiments, fastening system 100 may be adapted to removably couple first structure 110 to second structure 120.

In certain embodiments, first structure 110 and second structure 120 may be formed from any suitable material. For example, first structure 110 may be formed from high-temperature composite material. The present disclosure contemplates that first structure 110 and second structure 120 may be any suitable structures. In certain embodiments, and as illustrated in FIGS. 1A through 1D, first structure 110 may be a missile radome and second structure 120 may be the body of a missile. As another example, and not by way of limitation, first structure 110 may be a structure adapted for use in high-temperature environments, such as a nozzle edge, an engine part, a leading or trailing edge, or other part that remains hot.

Figure 1A:
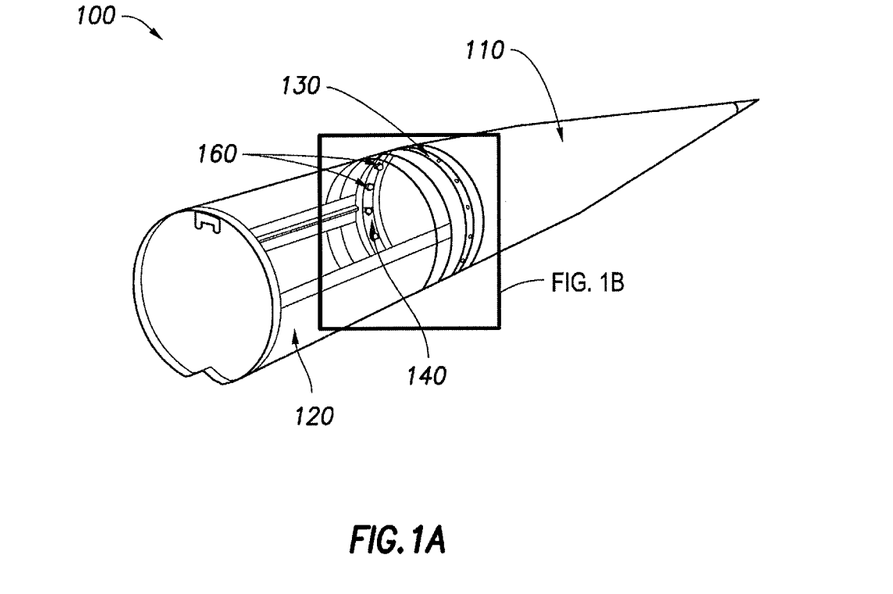
FIGS. 1A through 1D illustrate various views of a system utilizing a fastening system, in accordance with certain embodiments.
Figure 1B:
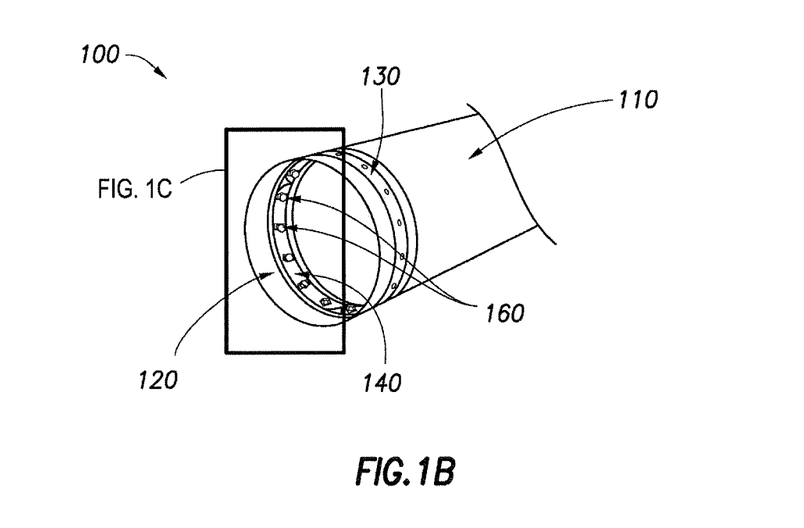
Figure 1C:
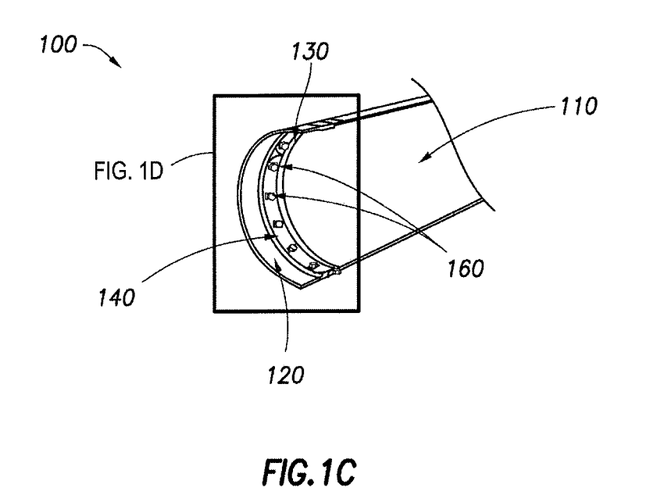
Figure 1D:
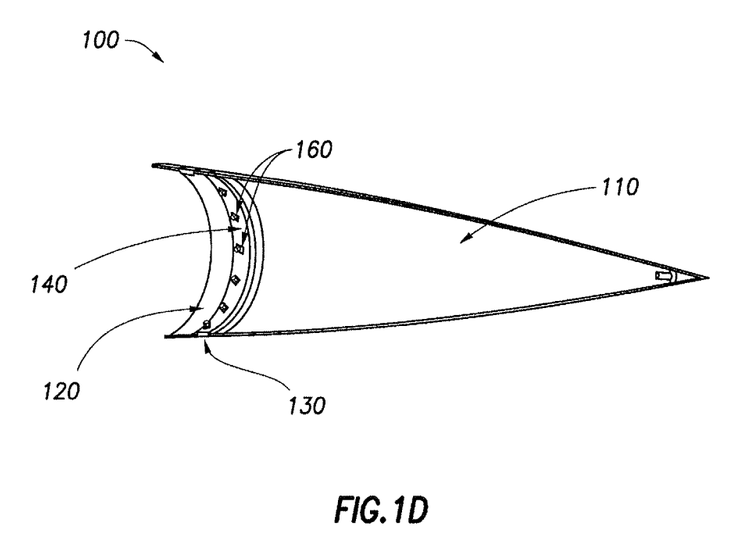
Figure 2:
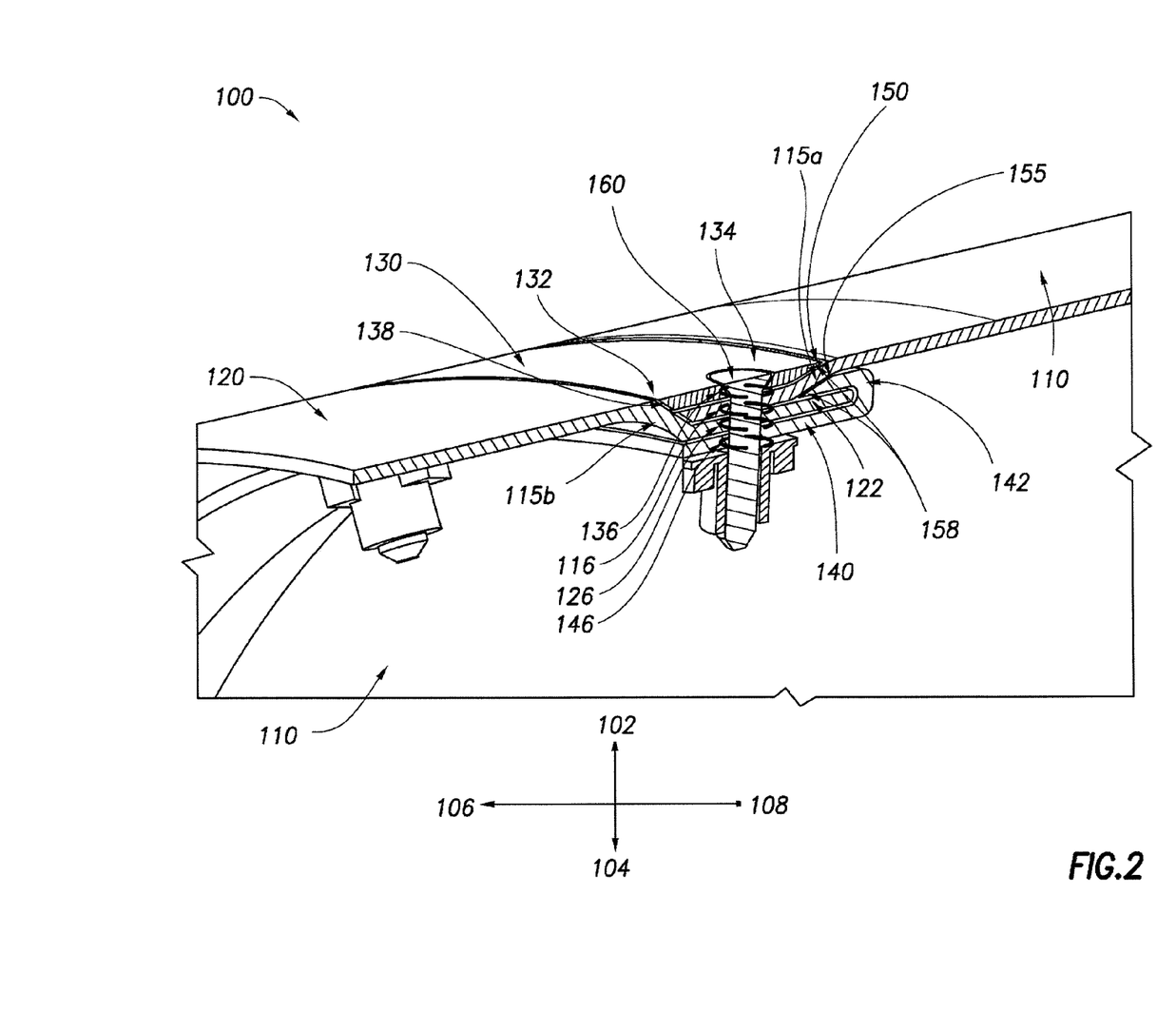
FIG. 2 illustrates a fastening system that may be used as the fastening system of FIG. 1, in accordance with certain embodiments.
Figure 3:
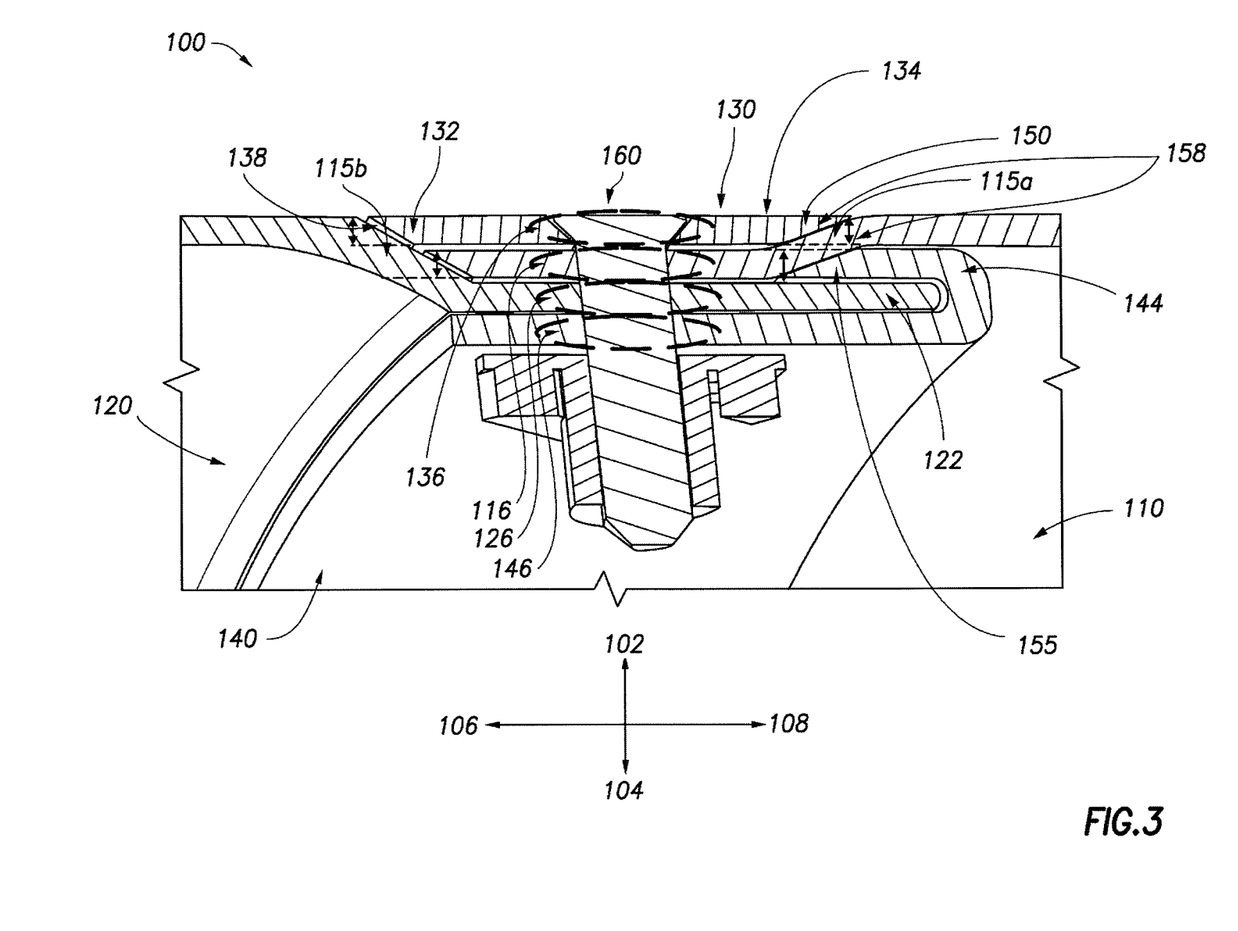
FIG. 3 illustrates another view of the fastening system of FIG. 1, in accordance with certain embodiments.

FIGS. 2 and 3 illustrate different views of fastening system 100 according to certain embodiments. Fastening system 100 may be used to removably couple structures such as a first structure 110 to a second structure 120. In certain embodiments, the first structure 110 may be formed from a high-temperature composite. As an example, and not by way of limitation, first structure 110 may be formed of CMC or C/C. In certain embodiments, second structure 120 may be formed of something other than a high-temperature composite. In certain other embodiments, second structure 120 may be formed of a high-temperature composite such as CMC or C/C. The present disclosure contemplates that first structure 110 and second structure 120 may be formed of any suitable material. In some embodiments, first structure 110 and second structure 120 may be dissimilar materials. In some embodiments, first structure 110 may be a component that must be able to withstand high temperatures. In certain embodiments, the structures may be components of a variety of systems. For example, and not by way of limitation, first structure 110 may be a radome, nose cone, control surface, access panel, or exhaust nozzle of an aircraft, rocket, missile, or other high performance structure.

In some embodiments, first structure 110 and second structure 120 may contain bends 115 (e.g., bends 115a and 115b). The present disclosure contemplates that first structure 110 and second structure 120 may be any suitable shape and have any suitable dimensions. As an example, and not by way of limitation, the portion of first structure 110 to be coupled to second structure 120 may have a circular shape. In certain embodiments, the portion of first structure 110 to be coupled to second structure 120 may be a portion of a missile radome having a circular shape.

In certain embodiments, fastening system 100 includes an outer band 130 and an inner band 140. Outer band 130 may overlap a portion of first structure 110, and inner band 140 may be positioned beneath second structure 120. In certain embodiments, outer band 130, first structure 110, second structure 120, and inner band 140 are coupled to each other using a fastener 160 through apertures 136, 116, 126, and 146 in outer band 130, first structure 110, second structure 120, and inner band 140, respectively. In certain embodiments, positioning first structure 110 between outer band 130 and inner band 140 prevents first structure 110 from moving in a first direction 102 or a second direction 104.

Outer band 130 may overlap a portion of first structure 110. In certain embodiments, outer band 130 may overlap an edge of first structure 110 as illustrated in FIGS. 2 and 3. Outer band 130 may have a first edge 132 and a second edge 134. First edge 132 may be shaped at an angle 138 corresponding to bend 115b in second structure 120. In certain embodiments, second edge 134 of outer band 130 may form a first load redistribution ramp 150. Outer band 130 may be adapted to prevent first structure 110 from moving in a third direction 106. In certain embodiments, outer band 130 may have one or more apertures 136. One or more apertures 136 of outer band 130 may be adapted to accept a fastener 160. The present disclosure contemplates that outer band 130 may be formed of any suitable material. As an example, and not by way of limitation, outer band 130 may be formed from high-temperature steel or titanium.

As described above, first structure 110 and second structure 120 may have any suitable shape. In certain embodiments, the dimensions of outer band 130 may be adapted to accommodate the shape of first structure 110 and second structure 120. As an example, and not by way of limitation, in certain embodiments, the portion of first structure 110 to be coupled to second structure 120 using fastening system 100 may have a circular shape. Second structure 120 may have a corresponding circular shape. In such an embodiment, the dimensions of outer band 130 may be adapted to fit the shape of first structure 110 and second structure 120. For example, outer band 130 may extend around all or a part of the circumference of first structure 110. In such an embodiment, outer band 130 may have a plurality of apertures 136. In certain embodiments, apertures 136 may be spaced apart along the length of outer band 130. In certain other embodiments, the plurality of apertures 136 may be arranged in any suitable fashion.

Inner band 140 may be positioned underneath a portion of second structure 120. In certain embodiments, inner band 140 may have a first surface 142 and a second surface 144. In certain embodiments, second surface 144 may form a second load redistribution ramp 155. Inner band 140 may be adapted to curve around an edge 122 of second structure 120, such that second load redistribution ramp 155 forms a wedge between first structure 110 and second structure 120, as illustrated in FIGS. 2 and 3. Inner band 140 may be adapted to prevent first structure 110 from moving in fourth direction 108. Inner band 140 may be formed of any suitable material. As an example, and not by way of limitation, inner band 140 may be formed from high-temperature steel or titanium.

The dimensions of inner band 140 may be determined in part based upon the anticipated thermal expansion of inner band 140. As an example, and not by way of limitation, the dimensions of inner band 140 may be determined such that thermal expansion in a fourth direction 108, which occurs in the portion of inner band located below second structure 120, is offset by thermal expansion in third direction 106, which occurs in the portion of inner band 140 located between first structure 110 and second structure 120.

As described above, in certain embodiments first structure 110 and second structure 120 may have any suitable shape. The dimensions of inner band 140 may be adapted to accommodate the shape of first structure 110 and second structure 120. As an example, and not by way of limitation, the portion of first structure 110 to be coupled to second structure 120 using fastening system 100 may have a circular shape. In such an embodiment, second structure 120 may have a corresponding circular shape. In such an embodiment, inner band 140 may extend along a portion of second structure 120 for all or a part of the circumference of second structure 120. In such an embodiment, inner band 140 may have a plurality of apertures 146. In certain embodiments, apertures 146 may be spaced apart along the length of inner band 140. In certain other embodiments, the plurality of apertures 146 may be arranged in any suitable fashion.

Load redistribution ramps 150 and 155 may be adapted to redistribute the concentrated fastener bearing load into the larger areas of first structure 110. Redistributing the concentrated load of the fastener across a larger area of first structure 110 may advantageously allow high-temperature composite parts such as CMC or C/C to be used despite their low bearing strength. Load redistribution ramps 150 and 155 may be formed at any suitable angle. In some embodiments, load redistribution ramps 150 and 155 may be between zero and ninety degrees. As an example, and not by way of limitation, load redistribution ramps 150 and 155 may be between fifteen and forty-five degrees. In certain embodiments, the angles of load redistribution ramps 150 and 155 may correspond to bend 115*a* in first structure 110. Fastening system 100 may be adapted such that load redistribution ramps 150 and 155 are positioned on opposing sides of bend 115*a* in first structure 110.

Fastener 160 may be any suitable fastener for coupling outer band 130, first structure 110, second structure 120, and inner band 140 to each other. As an example, and not by way of limitation, fastener 160 may comprise a bolt with a nut plate. Fastener 160 may couple outer band 130, first structure 110, second structure 120, and inner band 140 to each other by passing a bolt through apertures 136, 116, 126, and 146 in outer band 130, first structure 110, second structure 120, and inner band 140. In certain embodiments, apertures of outer band 130, first structure 110, second structure 120, and inner band 140 align with each other. In certain embodiments, aperture 116 of first structure 110 may have a diameter larger than fastener 160, such that fastener 160 does not directly contact first structure 110. This may prevent a concentrated fastener bearing load on first structure 110, which may be desirable where high-temperature composite materials having low bearing strength are used to form first structure 110.

In certain embodiments, such as the embodiment illustrated in FIG. 1, multiple fasteners 160 may be used. One or more apertures 136, 116, 126, and 146 of outer band 130, first structure 110, second structure 120, and inner band 140, respectively, may be spaced apart along overlapping portions of first structure 110 and second structure 120. In certain embodiments, the apertures 136, 116, 126, and 146 may be spaced apart at regular intervals. In certain other embodiments, the apertures 136, 116, 126, and 146 may have any suitable arrangement. The one or more apertures 136, 116, 126, and 146 may be adapted to receive one of the one or more fasteners 160. The number and arrangement of apertures 136, 116, 126, 146, and fasteners 160 may vary depending on the particular application of fastening system 100. The present disclosure contemplates the use of any suitable number of fasteners in any suitable arrangement.

In general, fastening system 100 may removably couple a first structure 110, such as a CMC structure, to a second structure 120, such as a non-CMC structure. First structure 110 and second structure 120 may have bends 115*a* and 115*b*, respectively, formed near the edge of the structures to be joined together. Outer band 130 may overlap a portion of first structure 110, and inner band 140 may be positioned beneath second structure 120, such that first structure 110 and second structure 120 are sandwiched between outer band 130 and inner band 140, as illustrated in FIGS. 2 and 3. Sandwiching first structure 110 and second structure 120 between outer band 130 and inner band 140 may advantageously prevent movement in a first direction 102 or second direction 104. In certain embodiments, a portion of inner band 140 may curve around an edge 122 of second structure 120.

In certain embodiments, outer band 130 and inner band 140 may include load redistribution ramps 150 and 155. Load redistribution ramps 150 and 155 may be formed at an angle 158 corresponding to bend 115*a* in first structure 110. As an example, and not by way of limitation, load redistribution ramps 150 and 155 may be formed at an angle 158 that is between fifteen and forty-five degrees. Load redistribution ramp 150 of outer band 130 may prevent movement of first structure 110 in third direction 106. Load redistribution ramp 150 may also redistribute a portion of the concentrated fastener load across a portion of first structure 110. Load redistribution ramp 155 of inner band 140 may prevent movement of first structure 110 in fourth direction 108. Additionally, in certain embodiments load redistribution ramp 155 may redistribute a portion of the concentrated fastener load across a portion of first structure 110. In certain embodiments, fastener 160 does not contact first structure 110. In certain embodiments, fastener 160 may not contact first structure 110 because the diameter of aperture 116 in first structure 110 may be larger than the diameter of fastener 160.

In general, fastening system 100 may be adapted for fastening two structures. As one example, the two structures may be components of a missile, such as a missile radome and the missile body. In certain embodiments, first structure 110 and second structure 120 may be adapted for use in high-temperature environments. For example, in certain embodiments first structure 110 may be a nozzle edge, an engine part, a leading or trailing edge, a missile radome, or other part that remains hot. Thus, some degree of thermal expansion of outer band 130 and inner band 140 may be likely.

In certain embodiments, outer band 130 and inner band 140 are adapted to respond to thermal expansion in a manner that further secures first structure 110 to second structure 120. In certain embodiments, inner band 140 is adapted to have equivalent thermal expansion in both a fore and aft direction (e.g., third direction 106 and fourth direction 108). Thus, the amount of thermal expansion that may occur in the portion of inner band 140 located beneath second structure 120 is countered by the thermal expansion of the portion of inner band 140 located between first structure 110 and second structure 120 in the opposite direction, securing the first structure 110 in place. Thermal expansion at the load redistribution ramps 150 and 155 of outer band 130 and inner band 140 may effectively pinch first structure 110 in between them as they expand, preventing undesirable movement of first structure 110.

Figure 4:
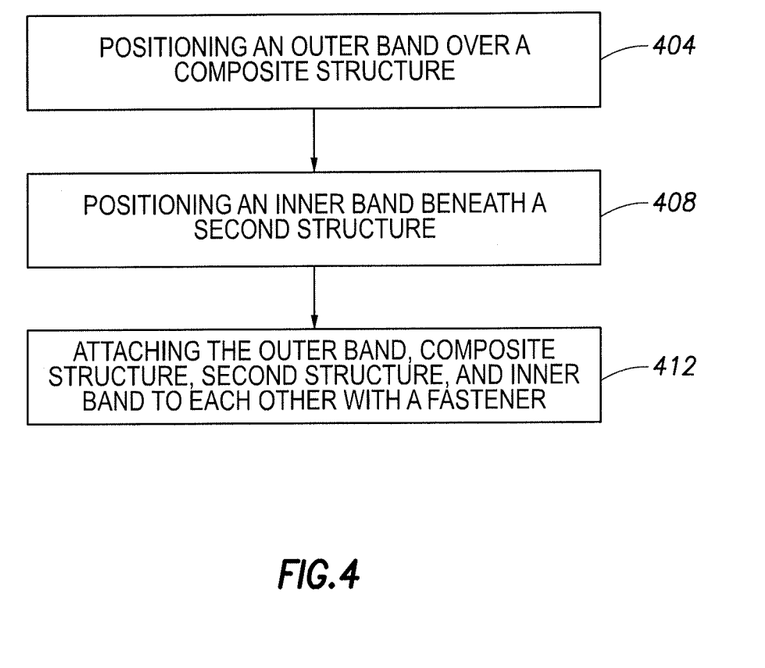
FIG. 4 illustrates a method for fastening structures, in accordance with certain embodiments.

FIG. 4 illustrates a method for fastening structures, in accordance with certain embodiments. At step 404, an outer band is positioned over a composite structure. For example, the outer band may be the outer band 130 described above, and the composite structure may be a missile radome. The outer band may cover a portion of the composite structure. In certain embodiments, the outer band may have a first edge proximate to a second structure and a second edge proximate to the composite structure. The second structure may be a non-composite structure. In certain embodiments, the second structure may be a portion of a missile body such as the missile body described above in FIGS. 1 through 3. In certain embodiments, the second edge of the outer band may form a first load redistribution ramp. For example, the first load redistribution ramp may be load redistribution ramp 150 described above in FIGS. 2 and 3. In certain embodiments, the first load redistribution ramp may correspond to a bend in the composite structure.

At step 408, an inner band is positioned beneath the second structure. For example, the inner band may be inner band 140 described above in FIGS. 1-3. The inner band may have a first surface proximate to the second structure and opposite a second surface proximate to the composite structure. In certain embodiments, the second surface may form a second load redistribution ramp. For example, the second load redistribution ramp may be second load redistribution ramp 155 described above in FIGS. 2 and 3. The second load redistribution ramp may correspond to the bend in the composite structure. In certain embodiments, a portion of the inner band adjacent to the second surface forms a curve around an edge of the second structure, such that the second load redistribution ramp forms a wedge between the composite structure and the second structure.

First and second load redistribution ramps may be adapted to redistribute a concentrated fastener bearing load into the larger areas of the composite structure.

Redistributing the concentrated load of the fastener across a larger area of the composite structure may advantageously allow a composite structure such as CMC or C/C to be removably coupled to a second structure despite the composite structure's low bearing strength. The first and second load redistribution ramps may be formed at any suitable angle. In some embodiments, load redistribution ramps 150 and 155 may be between zero and ninety degrees. As an example, and not by way of limitation, load redistribution ramps 150 and 155 may be between fifteen and forty-five degrees. In certain embodiments, the angles of first and second load redistribution ramps may correspond to the bend in first structure 110.

At step 412, the outer band, composite structure, second structure, and inner band are attached to each other with a fastener. For example, the outer band, composite structure, second structure, and inner band may be outer band 130, first structure 110, second structure 120, and inner band 140 described above in FIGS. 1 through 3. As another example, the fastener may be fastener 160. In certain embodiments, a portion of the fastener may pass through apertures of the outer band, composite structure, second structure, and inner band. For example, the apertures of the outer band, composite structure, second structure, and inner band may be apertures 136, 116, 126, and 146 described above in FIGS. 2 and 3. In certain embodiments, the aperture of the composite structure may be adapted to prevent the fastener from bearing directly against the composite structure.

In certain embodiments, the use of a fastening system in accordance with certain embodiments of the present disclosure may allow the composite structure and the second structure to be removably coupled. In certain embodiments, this may advantageously allow high-temperature composite parts to be used to protect sensors or other components from high temperatures, while still allowing ready access to the sensors or other components through removable coupling of the structures. In certain embodiments, this accessibility may make repairs or replacement of the composite structure, the second structure, or internal components easier.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. An apparatus, comprising:
    an outer band covering at least a portion of a first structure, the outer band having a first edge opposite a second edge, the second edge forming a first load redistribution ramp corresponding to a bend in the first structure;
    an inner band positioned beneath a second structure, the inner band having a first surface opposite a second surface, the second surface forming a second load redistribution ramp corresponding to the bend in the first structure, wherein a portion of the inner band adjacent to the second surface forms a curve around an edge of the second structure such that the second load redistribution ramp forms a wedge between the first structure and the second structure; and
    a fastener coupling together the outer band, the first structure, the second structure, and the inner band, a portion of the fastener extending through an aperture in each of the outer band, the first structure, the second structure, and the inner band.

2. The apparatus of claim 1, wherein the first structure comprises a composite structure and the second structure comprises a non-composite structure.

3. The apparatus of claim 1, wherein the first structure is selected from the group consisting of a radome, a nose cone, a control surface, an access panel, an exhaust nozzle of an aircraft, an exhaust nozzle of a rocket, and an exhaust nozzle of a missile.

4. The apparatus of claim 1, wherein an angle of the first load redistribution ramp and an angle of the second load redistribution ramp are each between fifteen and forty-five degrees.

5. The apparatus of claim 1, wherein the aperture in the first structure is adapted to prevent the fastener from contacting the first structure.

6. The apparatus of claim 1, wherein the inner band and the outer band comprise one of high-temperature steel and titanium.

7. The apparatus of claim 1, wherein the first structure is removable.

8. The apparatus of claim 1, the outer band adapted to prevent movement of the first structure in a first direction and the inner band adapted to prevent movement of the first structure in a second direction that is opposite from the first direction.

9. An apparatus, comprising:
    a first structure;
    a second structure; and a system for fastening the first structure to the second structure so that the first structure is removable from the second structure, the system comprising:
- an outer band covering at least a portion of the first structure and adapted to prevent the first structure from moving in a first direction, the outer band comprising:
  - a first edge proximate to the second structure; and
  - a second edge proximate to the first structure, the second edge forming a first load redistribution ramp corresponding to a bend in the first structure;
- an inner band positioned beneath a portion of the second structure and adapted to prevent the first structure from moving in a second direction that is opposite from the first direction, the inner band comprising:
  - a first surface proximate to the second structure; and
  - a second surface proximate to the first structure, the second surface forming a second load redistribution ramp corresponding to the bend in the first structure, wherein a portion of the inner band adjacent to the second surface forms a curve around an edge of the second structure such that the second load redistribution ramp forms a wedge between the first structure and the second structure; and
- a fastener coupling together the outer band, the first structure, the second structure, and the inner band, a portion of the fastener extending through an aperture in each of the outer band, the first structure, the second structure, and the inner band, the aperture in the first structure being adapted to prevent the fastener from contacting the first structure.

10. The apparatus of claim 9, wherein an angle of the first load redistribution ramp and an angle of the second load redistribution ramp are each between fifteen and forty-five degrees.

11. The apparatus of claim 9, wherein the first structure is selected from the group consisting of a radome, a nose cone, a control surface, an access panel, an exhaust nozzle of an aircraft, an exhaust nozzle of a rocket, and an exhaust nozzle of a missile.

12. The apparatus of claim 9, wherein the first edge of the outer band and an edge of the first structure are adapted to correspond to a bend in the second structure.

13. The apparatus of claim 9, wherein the first structure comprises a composite structure and the second structure comprises a non-composite structure.

14. A method for attaching two structures comprising:
- positioning an outer band over a first structure, the outer band covering at least a portion of the first structure and having a first edge proximate to a second structure, and a second edge proximate to the first structure, the second edge forming a first load redistribution ramp corresponding to a bend in the first structure;
- positioning an inner band beneath the second structure, the inner band having a first surface proximate to the second structure and opposite a second surface proximate to the first structure, the second surface forming a second load redistribution ramp corresponding to the bend in the first structure, wherein a portion of the inner band adjacent to the second surface forms a curve around an edge of the second structure such that the second load redistribution ramp forms a wedge between the first structure and the second structure; and
- attaching the outer band, the first structure, the second structure, and the inner band to each other with a fastener, a portion of the fastener passing through an aperture in each of the outer band, the first structure, the second structure, and the inner band, the aperture of the first structure adapted to prevent the fastener from bearing directly against the first structure.

15. The method of claim 14, wherein the first structure comprises a composite structure and the second structure comprises a non-composite structure.

16. The method of claim 15, wherein the first structure is selected from the group consisting of a radome, a nose cone, a control surface, an access panel, an exhaust nozzle of an aircraft, an exhaust nozzle of a rocket, and an exhaust nozzle of a missile.

17. The method of claim 14, wherein an angle of the first load redistribution ramp and an angle of the second load redistribution ramp are each between fifteen and forty-five degrees.

18. The method of claim 14, wherein the inner band and the outer band comprise one of high-temperature steel and titanium.

19. The method of claim 14, wherein the first structure is removable.

20. The method of claim 14, the outer band adapted to prevent movement of the first structure in a first direction and the inner band adapted to prevent movement of the first structure in a second direction that is opposite from the first direction.

\* \* \* \* \*